J. G. VAIL & J. D. CARTER.
PROCESS OF CLARIFYING LIQUID SILICATE OF SODA OR THE LIKE.
APPLICATION FILED MAY 1, 1914.
1,132,640.
Patented Mar. 23, 1915.
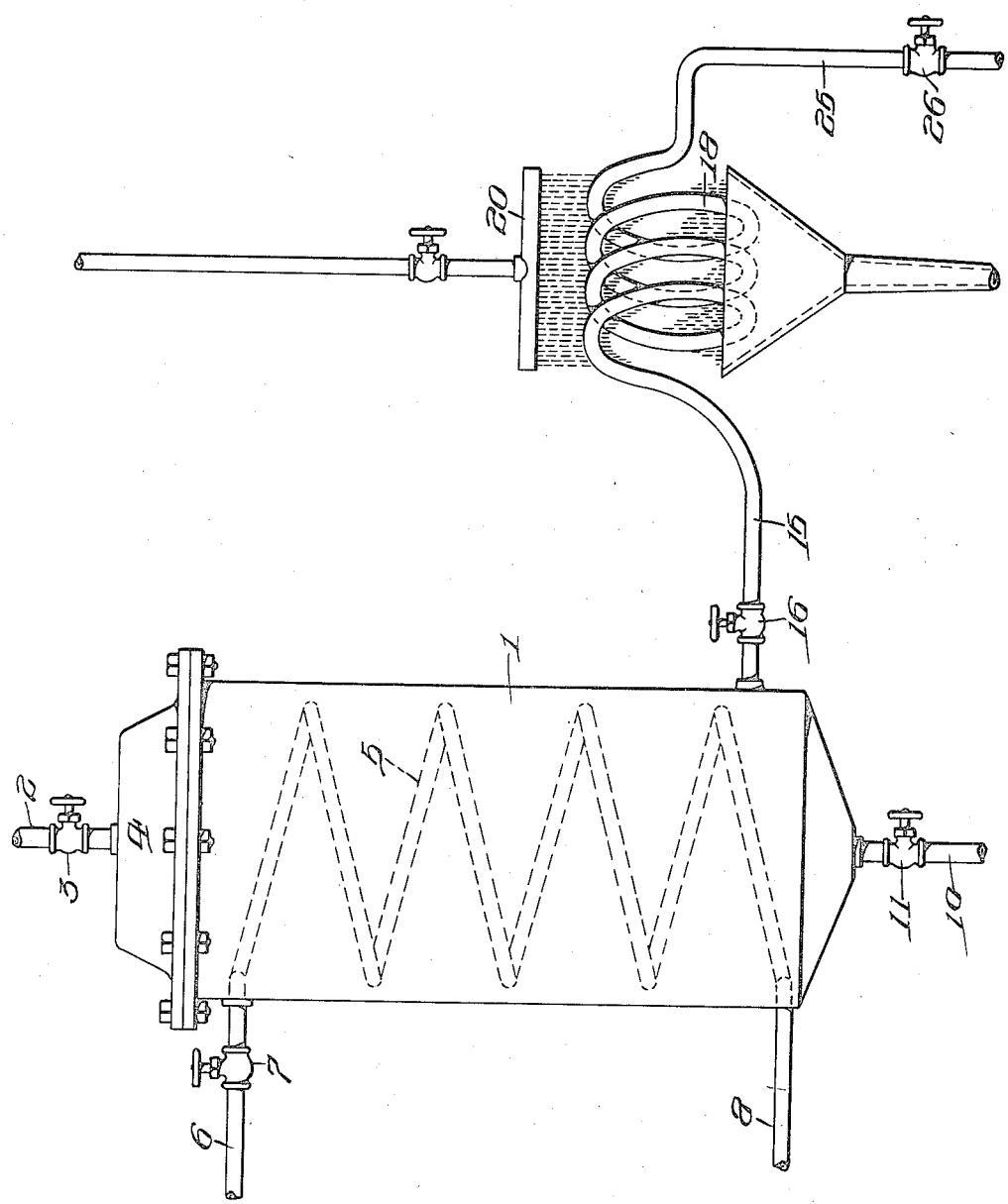
INVENTORS
James G. Vail,
John D. Carter.
WITNESSES

UNITED STATES PATENT OFFICE.

JAMES G. VAIL, OF CHESTER, AND JOHN D. CARTER, OF LANSDOWNE, PENNSYLVANIA.

PROCESS OF CLARIFYING LIQUID SILICATE OF SODA OR THE LIKE.

1,132,640.  Specification of Letters Patent.  Patented Mar. 23, 1915.

Application filed May 1, 1914. Serial No. 835,604.

*To all whom it may concern:*

Be it known that we, JAMES G. VAIL and JOHN D. CARTER, citizens of the United States, and residents of Chester, county of Delaware, and State of Pennsylvania, and of Lansdowne, county of Delaware, and State of Pennsylvania, respectively, have invented a certain new and useful Process of Clarifying Liquid Silicate of Soda or the like, of which the following is a specification, reference being had to the accompanying diagrammatic drawing.

Commercial liquid silicate of soda which has been formed preferably by dissolving in a suitable medium the solid silicate, prepared generally by the fusion of a suitable sand and soda or potash in a suitable furnace, is a viscous liquid having a cloudy and opaque appearance. It is also frequently decidedly grayish in color, although it may sometimes have a slightly brownish or even greenish hue, the color seeming to depend upon the nature or quality of the sand or silica employed in the formation of the solid silicate. The discolored, opaque, and cloudy appearance of the liquid silicate is undesirable from a commercial standpoint and limits the use of the article in certain of the arts. It is believed that this discolored and cloudy appearance of the liquid is due to a quantity of extremely finely divided suspended matter mechanically maintained within the liquid, which, owing to the viscosity of the liquid and its own infinitesimal weight, will not entirely settle out even though the liquid be kept standing for long periods of time, and which moreover cannot be readily filtered out or otherwise mechanically removed or chemically precipitated by any method hitherto known.

Numerous attempts to discover a practicable method suitable for commercial use for clarifying liquid silicates have been made, and, while such attempts have met with some degree of success when the liquid is of a comparatively low degree of concentration, as for example, below 15° Baumé, and while, by certain careful and painstaking special methods of filtration it has been possible to remove a considerable portion of the discoloration and cloudy appearance from the more concentrated liquid silicates, as for example those of 40° Baumé concentration, yet these latter filtration processes have been by no means satisfactory from a commercial standpoint, being slow and extremely expensive, and producing, at best, a liquid which, while clear, cannot be described as sparkling or brilliant. We have found, however, that by the use of our process as hereinafter described, we are able to clarify liquid silicate of soda or other liquid silicate of a considerable degree of concentration, as for example of 40° Baumé or less, to such an extent that the liquid becomes substantially as clear and brilliant in appearance as pure water, and when placed in a suitable transparent container such as a bottle, cannot by its appearance be easily distinguished therefrom.

A principal object of our invention is, therefore, to provide a process for clarifying liquid silicate of soda or the like of a considerable degree of concentration, as for example up to 40° Baumé or slightly greater concentration. Further objects of our invention are to provide such a process which shall be capable of being readily carried out, which shall not materially increase the cost of the finished product, which shall require no especial degree of skill on the part of the operator, which shall be thoroughly feasible and practical from a commercial standpoint, which shall not materially affect the degree of concentration of the silicate treated, and which shall not necessitate the employment of any specific form of apparatus.

Our invention further includes all of the other novel features, operations and characteristics hereinafter more definitely specified.

While we do not desire to limit ourselves to any specific form of apparatus for carrying out our process as hereinafter described, as the same may be performed in any suitable apparatus, nevertheless, for the purpose of facilitating the description of our process, one form of apparatus suitable for carrying it out is diagrammatically illustrated in the accompanying drawing forming a part of this specification.

Broadly speaking, our process consists in the treatment of liquid silicate of soda or the like in the presence of heat, in a suitable closed container, and for a suitable period, while maintaining the liquid in a quiescent state. Such treatment may be conveniently carried out in an apparatus similar to that diagrammatically illustrated in the accompanying drawing, in which—

1 is a suitable tight receptacle of any desired size, and of sufficient strength to withstand considerable internal pressure, provided at its upper end with a pipe 2, having a valve 3, through which the liquid silicate may be introduced within the receptacle. The top 4 of the receptacle may be made removable as shown, and a suitable steam coil 5 may be provided in the interior of the receptacle, a pipe 6 provided with a valve 7, being arranged to admit steam to the coil, and another suitable pipe 8 to conduct it from the coil. Preferably at the center of the bottom of the receptacle may be located another pipe 10, having a valve 11, the bottom of the receptacle being preferably somewhat inclined downwardly toward the center. Located a short distance above the bottom may be another pipe 15, provided with a valve 16, and connecting the interior of the receptacle 1 with the cooling coil 18, above which may be suspended a sprayer 20 of any desired form, adapted to distribute cold water or other cooling medium over the coil, which at its outer end is provided with a leading-off pipe 25, having a valve 26.

In the carrying out of our process the liquid silicate of soda may be introduced within the receptacle 1 by means of the pipe 2, which, when a sufficient quantity has been admitted to the receptacle, may be closed by the valve 3, the valves 11 and 16 being already closed. Steam at a suitable pressure is then admitted to the interior of the steam coil 5 for a suitable period, depending upon the degree of concentration of the silicate and the temperature of the steam. In practice for example, good results may be obtained with silicate of 40° Baumé concentration, when the treatment is continued for a period of approximately two hours, the steam within the coil being maintained approximately at a pressure of 75 to 80 pounds.

At the end of the period of treatment, it will be found that a considerable quantity of finely divided, flocculent matter will have been precipitated to the bottom of the receptacle, and that above this matter the liquid silicate will be substantially as clear, brilliant and transparent as water, and it may be drawn off from above the precipitate in any desired manner. We have found in practice, however, that it is desirable to draw off the liquid silicate while heated and still under the pressure generated within the receptacle, which may be readily done by means of the pipe 15, and for the purpose of cooling the liquid as it is drawn off and preventing the same from being atomized by the pressure behind it when it reaches a point of lower pressure in the pipe 15, we have found it desirable in practice to provide a cooling coil or similar apparatus 18 of any suitable construction, through which the liquid may be caused to flow and from which it may be led by the leading-off pipe 25, provided with the valve 26 for controlling the flow of the liquid to any desired receptacle. It will be found that the liquid silicate of soda which flows from this pipe will be substantially transparent in appearance as hitherto described, and that its degree of concentration will not have been materially increased owing to the treatment of the silicate having been carried out in a closed vessel. From time to time after the treatment of a quantity of the liquid silicate, the precipitated matter may be drawn off from the receptacle by the pipe 10, and the interior of the receptacle cleaned out by flushing or in any other desired manner.

In the carrying out of our process we have found that the most satisfactory results are attained with those silicates in the formation of which silica or sand having a small proportion of alumina is utilized. We therefore consider it advisable to supply this element at the time of the formation of the solid silicate in the furnace, or otherwise, if it be not already present in sufficient quantities in the silica or sand. However, the presence of the alumina seems by no means necessary to the successful operation of the process, and it may therefore be omitted if desired. Moreover, we have further discovered that the presence of magnesia in the sand from which the silicate was made, or its presence from other causes in the liquid silicate is inimical to the successful working of our process, and the use of sand or other materials containing this element should therefore be avoided.

We do not desire to limit ourselves in the carrying out of our process to any specific form or style of apparatus, as the process as heretofore stated may be carried out in any apparatus suitable for the purpose, that form of apparatus diagrammatically illustrated in the drawing being merely one form suitable therefor, nor do we desire to limit ourselves to any specific temperature or any specific length of time during which the liquid silicate is to be treated, as it will be found in practice that both the temperature at which the liquid silicate is maintained during the process as well as the length of time during which the liquid silicate is treated may be varied within considerable limits and still produce satisfactory results, and it will thus be evident that various changes may be made in the details of the process without departing from the spirit and scope of the invention as defined in the appended claims.

Having thus described our invention, we claim and desire to protect by Letters Patent of the United States:

1. The process of clarifying liquid silicate of soda or the like, which comprises the treatment of the liquid silicate with heat while in a quiescent condition.

2. The process of clarifying liquid silicate of soda or the like, which comprises the treatment of the liquid silicate with heat in a closed container without agitation.

3. The process of clarifying liquid silicate of soda or the like which consists in exposing the liquid silicate in a quiescent condition to the action of heat and pressure in a suitable receptacle.

4. The process of clarifying liquid silicate of soda or the like which consists in introducing the liquid silicate into a suitable receptacle, exposing the liquid silicate to the action of heat therein without agitation, and withdrawing the liquid silicate from said receptacle through a cooling coil.

5. The process of clarifying liquid silicate of soda or the like, which consists in introducing the liquid silicate into a suitable receptacle, exposing the liquid silicate to the action of heat and pressure without agitation within said receptacle, and withdrawing the liquid silicate from said receptacle through a cooling coil.

6. The process of clarifying liquid silicate of soda or the like, which consists in introducing the liquid silicate into a suitable closed receptacle, subjecting the liquid silicate to heat and pressure within said receptacle while said liquid is maintained in a quiescent condition, and withdrawing the silicate from a point above the bottom of said receptacle while the pressure is substantially maintained within said receptacle.

In witness whereof, we, JAMES G. VAIL and JOHN D. CARTER, have hereunto set our hands this 29th day of 4th mo., A. D. 1914.

JAMES G. VAIL.
JOHN D. CARTER.

Witnesses:
HENRY W. JONES,
CLIFFORD E. BLYTHE.